June 17, 1952   G. W. HOLLANDSWORTH   2,601,019
SPREADER DISK MOUNTING FOR COLTER BLADES
Filed March 19, 1948
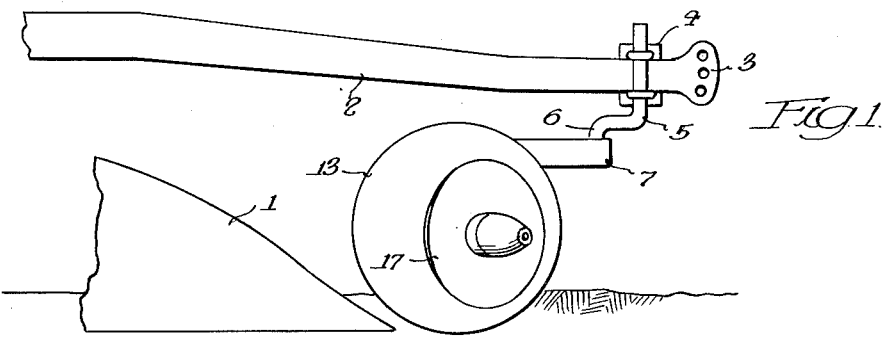
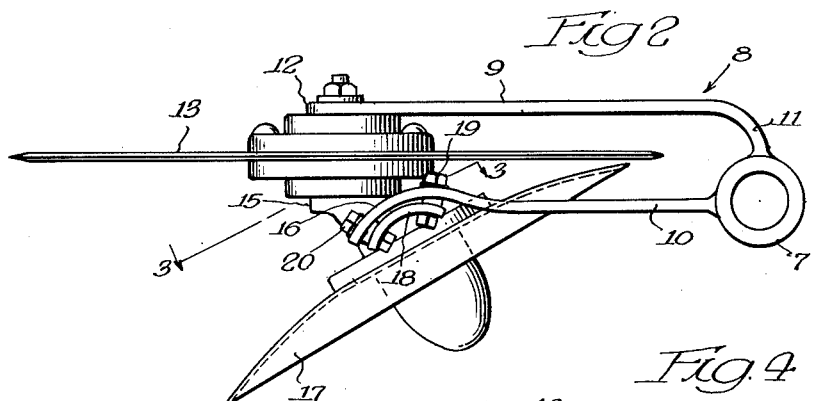
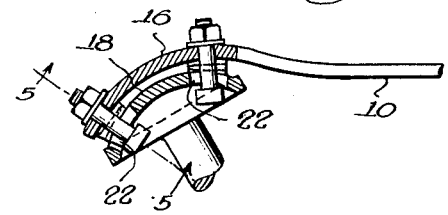
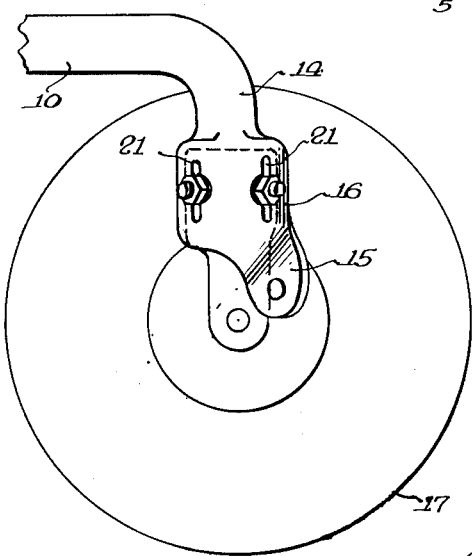
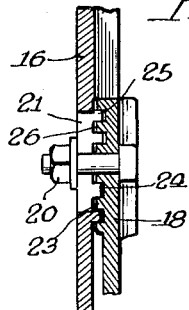
Inventor
George W. Hollandsworth
By Spencer, Marzall, Johnston & Cook,
Attys.

Patented June 17, 1952

2,601,019

UNITED STATES PATENT OFFICE 2,601,019

SPREADER DISK MOUNTING FOR COLTER BLADES

George W. Hollandsworth, Knox, Ind.; Ethel Busse executrix of said George W. Hollandsworth, deceased.

Application March 19, 1948, Serial No. 15,784

1 Claim. (Cl. 97—198.1)

This invention relates to farming implements wherein a coulter blade mounted forwardly of the leading edge of a plow has in association therewith a spreader disc having its cutting edge adjacent the leading edge of the coulter blade. The invention relates more particularly to a novel form of adjustable mounting means for the spreader disc whereby it may be adjusted relative to the coulter blade.

The primary object of the present invention is to provide a new and novel form of releasable and adjustable mounting means for a spreader disc, whereby it may be adjustable with respect to the adjacent coulter blade.

Another object of the invention is to provide a novel form of mounting means for a spreader disc which permits adjustment of the spreader disc in more than one direction, and wherein adjustment of the spreader disc will take place in one direction in a substantially arcuate path.

A further object of the invention is to provide a novel form of mounting means for a spreader disc whereby it may be adjusted in more than one direction, and wherein positive locking means are provided to positively lock the spreader disc in its adjusted position in one direction.

A still further object of the invention is to provide mounting means for a coulter blade and spreader disc in association therewith, wherein a bracket has a pair of spaced arms, one of which arms is adapted to rotatably support the coulter blade, and the other of said arms being adapted to rotatably and adjustably support the spreader disc. Means are provided for adjusting the spreader disc in an arcuate path in one direction and for adjusting the spreader disc in a substantially straight line path in another direction, and to positively lock the spreader disc in its adjusted position.

Other objects and advantages of the invention will become apparent upon reading the following description taken in conjunction with the accompanying drawing in which:

Fig. 1 is a detail elevational view of a plow construction embodying the present invention;

Fig. 2 is a plan view on an enlarged scale of the coulter blade and spreader disc together with the mounting means therefor;

Fig. 3 is a detail vertical sectional view on the line 3—3 of Fig. 2;

Fig. 4 is a detail horizontal sectional view through the mounting means shown in Fig. 2; and Fig. 5 is an enlarged detail vertical sectional view on line 5—5 of Fig. 4.

The farming implement disclosed herein for the purpose of illustrating the invention is attached to an agricultural implement such as a plow 1, which may be of the conventional plowshare and mold-board type, or it may be the disc plow type. The plow 1 is operatively connected in the usual manner to a plow beam 2, there being connecting means 3 provided at the forward end of the plow beam 2 to permit connection to a tractor or other suitable means for pulling the plow. A clamp 4 rigidly, but adjustably, supports an arm 5 which may be in the form of a bell crank, as shown, the construction being such as to permit vertical adjustment. The lower arm 6 of the bell crank lever extends into a bearing 7 on the bracket arm generally indicated at 8. The bracket 8 is preferably composed of two spaced apart arms 9 and 10. The arm 9 is offset from the bearing 7 and is connected thereto by the curved portion 11. The other arm 10 extends directly rearwardly from the bearing 7. The rear end of the arm 9 extends downwardly as at 12 and rotatably supports a coulter blade 13.

The rear end of arm 10 also extends downwardly as at 14 and the lower end thereof is bent or twisted slightly as at 15, whereby the coulter blade 13 may be supported between the two arms 9 and 10.

Intermediate the end 15 and the downwardly curved portion 14 of the arm 10 there is an arcuate portion 16 for a purpose which will presently be described. The spreader disc 17 is mounted in any suitable manner on an arm 18 also having a curved or arcuate configuration substantially as shown in Figs. 2 and 4. The curved portion 18 is adapted to be received within the concave part of the arcuate portion 16 on the arm 10 and is releasably and adjustably secured thereto by means such as the bolts 19 and 20. The formation of the arm 19 on the bracket 8 is such as to enable the spreader disc 17 to be mounted angularly with respect to the coulter blade 13 so that the leading edge of the spreader disc will be located adjacent the leading edge of the coulter blade 13.

The spreader disc 17 is rigidly secured to the arcuate arm 18, so that any adjustment of the arm 18 with respect to the supporting bracket will cause a corresponding adjustment of the spreader disc 17 with respect to the coulter blade 13. The arcuate portion 16 of the arm 10 is provided with a pair of vertically extending slots 21 through which the bolts 20 are adapted to pass and be secured. The arcuate portion of the arm 18 is provided with a pair of substantially horizontally extending slots 22 through which the bolts 20 also pass. When the bolts 20 are loosened, adjustment of the arm 18 may be had either in a vertical direction by reason of the slots 21, or in a horizontal direction by reason of the slots 22, or in both directions.

When the adjustment of the spreader disc 17 is made in a substantially horizontal direction, the path of its movement in making the adjustment will be arcuate because of the close association of the two arcuate mounting means 16 and 18. Thus, the location of the leading edge of the spreader disc 17 may be adjusted forwardly and rearwardly with respect to the leading edge of the coulter blade 13 in an arcuate path. The result of this type of adjustment is to enable the leading edge of the spreader disc 17 to be moved in a plane which is almost parallel with the coulter blade 13. Thus, forward and rearward adjustment may be made of the spreader disc without varying the spacing between the leading edge of the spreader disc and the plane of the coulter blade. The spreader disc 17 has a concavo-convex configuration, so that the leading edge thereof terminates in a plane substantially parallel to the plane of the coulter blade. The arcuate adjustment of the spreader disc will enable this relationship to be maintained between the spreader disc and coulter blade while permitting a forward and rearward adjustment thereof.

Vertical adjustment of the spreader disc 17 is made by reason of the vertical slots 21, and means are provided for positively locking the spreader disc in any adjusted position in a vertical direction. While the form of positive locking means may be of any suitable and desirable nature, the form shown in Fig. 5 is that which has been found to be most satisfactory. The arcuate arm 18 is provided with a plurality of spaced apart teeth 23 having spaces 24 therebetween. The arcuate portion 16 of arm 10 also has a plurality of spaced apart teeth 25 provided with spaces 26 therebetween. The teeth 23 on arm 18 are received within the spaces 26 on arm 16, and at the same time the teeth 25 on arm 16 are received within the recesses 24 on arm 18. When the bolts 20 are tightened, these interlocking teeth form a positive locking means which will prevent the spreader disc from being inadvertently moved out of its vertical adjustment. When a vertical adjustment is to be made, the bolts 20 are loosened and arm 18 carrying the spreader disc 17 may be moved upwardly or downwardly a distance equal to the width of one or more of the teeth thereon.

The invention contemplates a novel mounting means to permit multi-directional adjustment of a spreader disc with respect to the coulter blade associated therewith. The mounting means is such that adjustment of the spreader disc may be made in an arcuate path in one direction and in a substantially straight line path in another direction. While the spreader disc may be a flat disc instead of having a concavo-convex form, the arcuate line of adjustment is particularly useful with this latter form. The construction is also such as to permit its usefulness not only in connection with plows, but also with grain drills, corn planters and other similar articles as well.

Changes may be made in the form, construction and arrangement of parts from that disclosed herein without in any way departing from the spirit of the invention or sacrificing any of the attendant advantages thereof, provided, however, that such changes fall within the scope of the claim appended hereto.

The invention is hereby claimed as follows:

In a farming implement having a coulter blade and a spreader disc arranged adjacent and at an angle thereto, mounting means for said spreader disc comprising a bracket having a concave face thereon, horizontally spaced and substantially vertically extending rows of horizontal teeth on the inner surface of said concave face, a plurality of vertically extending horizontally spaced slots in said concave face, an arm on said spreader disc having a convex face disposed within the concave face of said bracket, horizontally spaced and vertically extending rows of horizontal teeth on the inner surface of said convex face interengaging the teeth on said concave face, horizontally spaced and horizontally extending slots in said convex face intersecting the vertical slots in said concave face, and releasable fastening means passing through the intersecting slots, said vertical slots and interengaging teeth permitting and maintaining a vertical adjustment of said spreader disc, said horizontal slots permitting adjustment of said spreader disc in a horizontal plane, and said concave and convex faces being adapted to maintain the leading edge of the spreader disc at a substantially constant distance from the coulter blade during adjustment of the spreader disc in an arcuate path.

GEORGE W. HOLLANDSWORTH.

REFERENCES CITED

The following references are of record in the file of this patent:

UNITED STATES PATENTS

| Number | Name | Date |
|---|---|---|
| 243,102 | Bradley | June 21, 1881 |
| 305,853 | Shaw | Sept. 30, 1884 |
| 1,244,714 | Dickinson | Oct. 30, 1917 |
| 1,260,752 | Casaday | Mar. 26, 1918 |
| 2,230,750 | Hollandsworth | Feb. 4, 1941 |